Oct. 28, 1941.                C. R. ROCHE                2,260,406
              GOVERNOR FOR AUTOMATIC TRANSMISSION
                Filed April 23, 1938      3 Sheets-Sheet 2
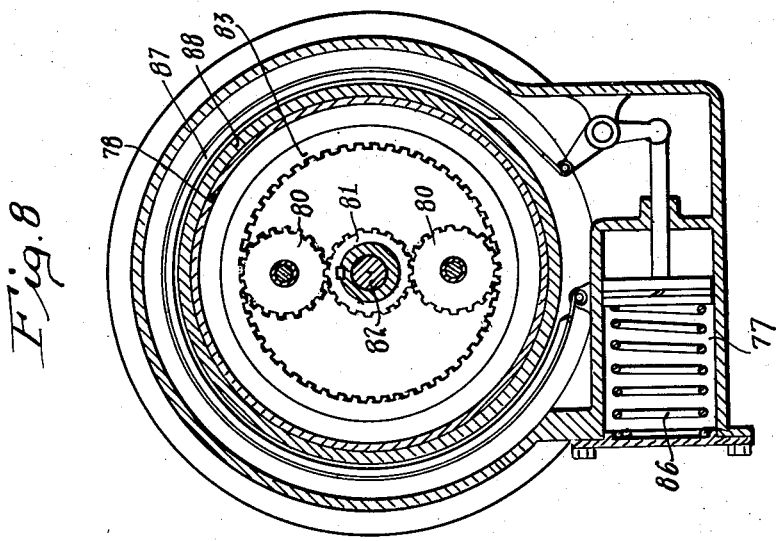
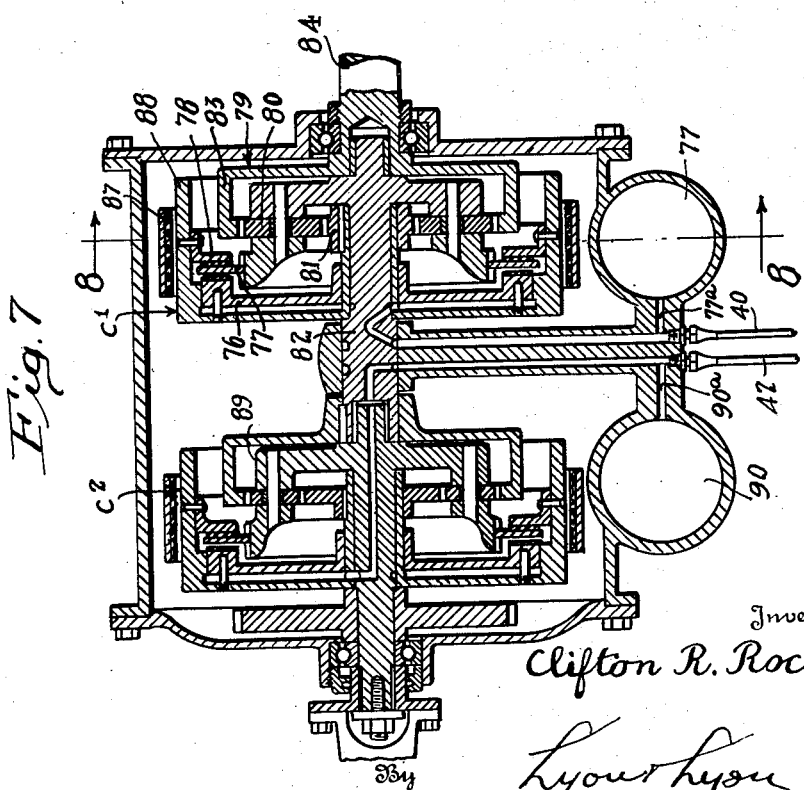

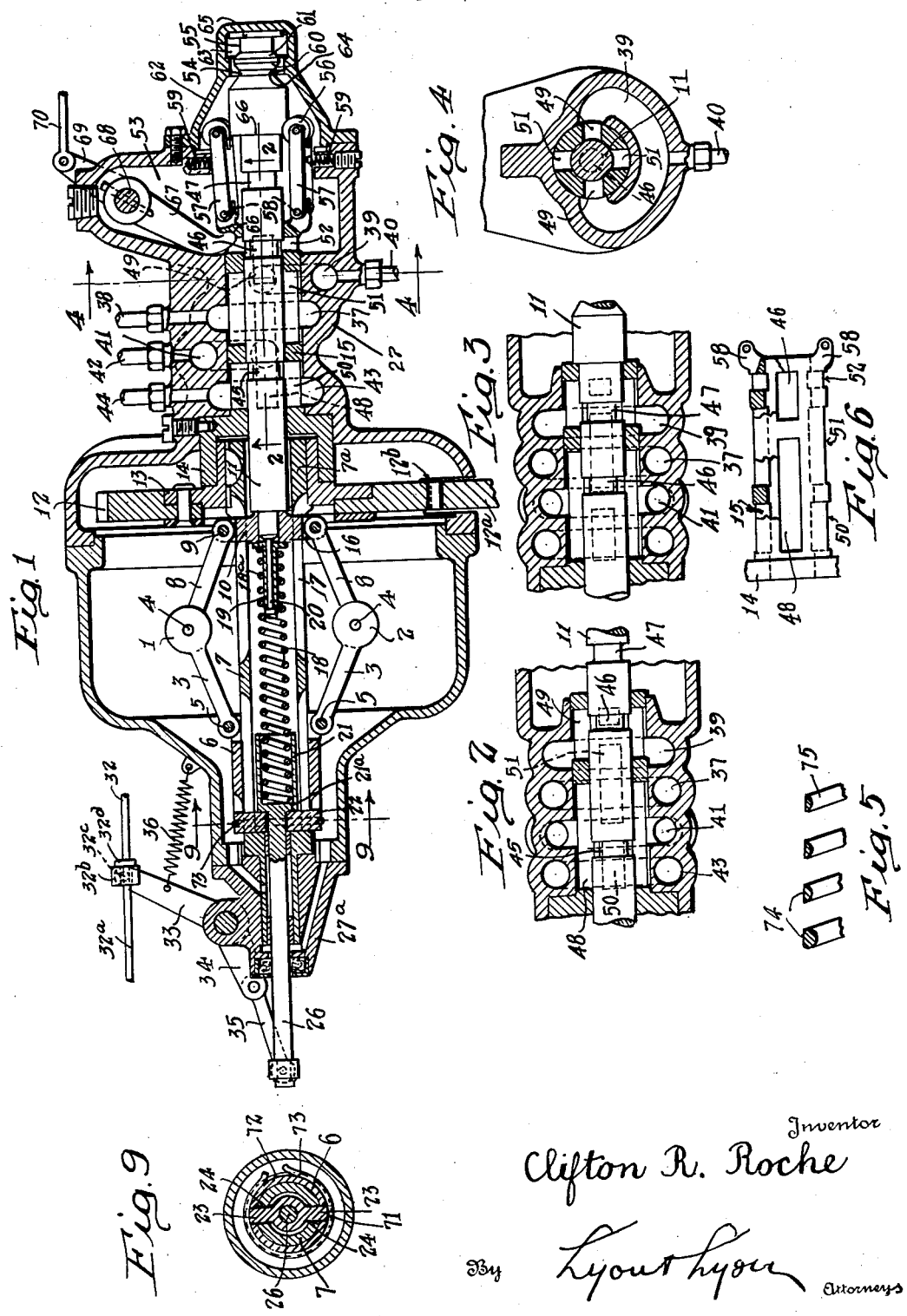

Oct. 28, 1941.  C. R. ROCHE  2,260,406
GOVERNOR FOR AUTOMATIC TRANSMISSION
Filed April 23, 1938   3 Sheets-Sheet 3

Inventor
Clifton R. Roche
By Lyon & Lyon
Attorneys

Patented Oct. 28, 1941

2,260,406

UNITED STATES PATENT OFFICE 2,260,406

GOVERNOR FOR AUTOMATIC TRANSMISSION

Clifton R. Roche, Los Angeles, Calif.

Application April 23, 1938, Serial No. 203,874

18 Claims. (Cl. 74—336.5)

This invention relates to a governor, and while features of the invention may be applied in the construction of governors for different purposes, the invention is intended to be applied particularly for controlling the operation of transmission mechanism for driving a vehicle such as an automobile of common construction at different speeds.

One of the objects of the invention is to provide a governor having means for adapting it to different speeds.

A further object of the invention is to produce a governor particularly adapted to cooperate with a motor having a transmission for driving at different speeds, and so constructed that as the motor and vehicle accelerates, the governor will automatically connect up successively, the different drives. This is most important in the operation of motor vehicles, and particularly motor vehicles operated by a gasoline engine, the control of which in driving, necessitates the use of a slow speed to start the vehicle, and involves the shifting of the transmission mechanism to a higher speed or higher speeds as the motor and vehicle accelerate; and one of the objects of my invention is to provide means for altering the action of the governor in response to different driving conditions encountered while driving the vehicle, and which necessitate corresponding different degrees of throttle opening.

A further object of the invention is to construct a governor for a motor-driven vehicle, which is correlated in its action to the load required of the motor, and while this can be accomplished in other ways, in the present specification I have described means for varying the action of the governor in accordance with the condition of the means that admits operating medium to the motor.

When the invention is applied to a governor having centrifugal weights, one of the objects of the invention is to provide means for regulating the distance of the weights from their axis of rotation to correspond with the speed of the vehicle and the load on the motor.

My invention is particularly applicable in a governor of the type in which oppositely disposed centrifugal weights are mounted for rotation about an axis. In such a governor the weights are usually supported on inclined arms. One set of arms is usually pivotally mounted so that the pivots rotate in a fixed plane, and as the governor weights move in or out under the action of the centrifugal force, the other arms shift a collar or other part movable along the axis of rotation of the governor, and this movement effects the desired regulation of a valve or other part by the governor. In accordance with my invention as applied to a governor of this type, I provide means for shifting the relatively fixed end of the governor apparatus, and I provide for shifting this part of the governor automatically in the controlling of the motor. A further object of this invention is to provide such an automatic control mechanism with means for enabling it to be controlled at will at any time, in such a way as to inhibit the operation of the governor.

A further object of the invention is to provide the governor with a spring having a special construction enabling it to operate as a relatively weak spring when the spring is extended, but which is so constructed that as force is exerted on the spring, the spring will automatically change its character, and become a spring which requires increased force to compress it.

Further objects of the invention will appear hereinafter.

The invention consists in the novel parts and combination of parts to be described hereinafter, all of which contribute to produce an efficient governor for automatic transmission.

A preferred embodiment of the invention is described in the following specification, while the broad scope of the invention is pointed out in the appended claims.

In the drawings:

Figure 1 is a longitudinal section through a governor embodying my invention, and through a part, the position of which is controlled by the governor when in action, and illustrating preferred details of construction for the apparatus.

Figure 2 is a fragmentary horizontal section taken on the line 2—2 of Figure 1, passing through the casing, broken away, and illustrating details of the hydraulic control valve illustrated in Figure 1, which is regulated by the action of the governor. This view shows the casing and valve broken away, and shows the valve in the same position in which it is illustrated in Figure 1.

Figure 3 is a section similar to Figure 2, but showing the valve in an extreme position opposite to that in which it is illustrated in Figures 1 and 2.

Figure 4 is a vertical cross section taken on the line 4—4 of Figure 1. In this figure, and in Figures 2 and 3, portions of the casing are broken away.

Figure 5 is a vertical section taken through one end of a spring of the type which I prefer to employ when using a spring in connection with the governor, and illustrating the manner in which I treat the spring to enable it to perform the functions of a weak spring when it is first under compression while performing functions of a stronger spring at a later stage of its compression.

Figure 6 is a side elevation, broken away, and shown partially in section, illustrating the sleeve in which the valve operates.

Figure 7 is a longitudinal section through the transmission mechanism and particularly illustrating the clutches and their connections for driving the car at its different speed ratios.

Figure 8 is a vertical cross-section through Figure 7, taken about on the line 8—8 of Figure 7.

Figure 9 is a vertical cross-section on the line 9—9 of Figure 1.

Figure 10:
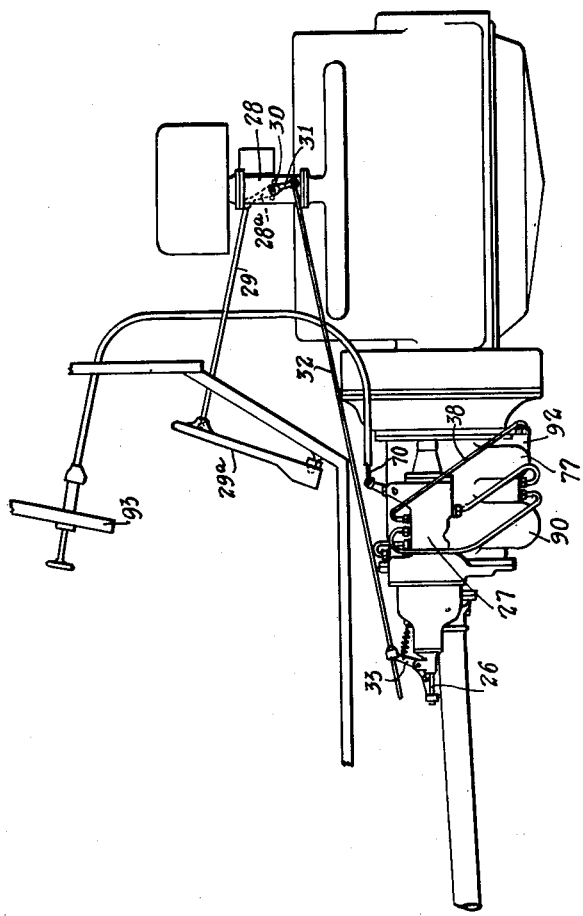
Figure 10 is a side elevation of the engine indicating the throttle control and its connection to the central member that controls the clutches of the transmission; and also showing the pipe connections from the control member casing to the clutches.

Referring more particularly to the parts, and particularly to Figure 1, 1 and 2 indicate two centrifugal weights which are mounted for rotation about an axis between the same. These weights are mounted so that they are supported from one side at a relatively fixed point, so that when they swing outwardly under the action of centrifugal force, they will cause a movement of a part connected with them at the other side. This movement I utilize for actuating a control member that regulates the transmission from the motor. In the present instance the control member is the port 11 to be described hereinafter. The weights 1 and 2 are attached to, or formed at the ends of, a pair of inner arms 3, which are pivotally attached at joints 4 to the governor weights, and at their inner ends are pivotally attached on pins 5 to a bracket 6, said bracket being a relatively fixed member referred to above. This member 6 is in the form of a sleeve or collar mounted to slide freely on the outside of a tubular shaft 7 mounted to rotate on the axis of the governor and having a neck 7a rigidly secured on the hub 13 of a gear 12. The outer arms 8 of the governor are pivotally attached to the joints 4, and at their outer ends are pivotally attached by pivot pins 9 to a bracket 10, which is in the form of a collar rotatable with respect to control member 11. This control member 11 may be of any suitable construction that will enable it to control the operation of a transmission mechanism driven by the motor with which the governor cooperates. In the present instance, this control member 11 is in the form of a valve that controls the supply of fluid to a transmission mechanism, illustrated in Figures 7, 8 and 10, having clutches controlled by the admission of the fluid to different parts of the same.

In Figure 1 the collar 10 and the control member 11 are illustrated in an extreme position toward the right, at which time the full diameter of the valve fills the bore in sleeve 15, to be described hereinafter, so that operating fluid or liquid cannot flow through to the transmission mechanism. In other words, this position corresponds to a position of rest of the vehicle and governor. The tubular shaft 7 is driven at a speed corresponding to the speed of the vehicle by any suitable means. In the present instance I have illustrated a gear wheel 12, driven by a gear 12a through a slot 12b in the casing, said gear 12a being driven from some member that rotates when the vehicle is advancing. The hub 13 of this gear is mounted in a bearing 14 which, if desired, may be formed integral with the slotted sleeve 15 in which the control valve 11 operates and slides to and fro as the collar 10 is moved by the action of the centrifugal force on the weights 1 and 2. The gear wheel 12 may be made of rawhide, or other similar material, to enable it to operate silently. The bracket or collar 10 has outwardly projecting ears 16 that project through radial slots 17 in the tubular shaft 7. Through these slots the rotating shaft 7 imparts rotation to the governor bracket 10 and these slots extend a considerable distance from the collar 10, so as to permit the collar to shift to and fro on the axis of the shaft 7 during the action of the governor.

The governor is provided with resistance means for resisting the movement of the collar 10 under the action of the centrifugal weights, and this means is preferably in the form of a coil spring 18, which may be located in the bore of the tubular shaft 7, the adjacent end of the spring being received over a sleeve 19 carried on the reduced end 20 of the control member or valve 11. The other end of the spring 18 is received in a spring barrel 21 that may be in the form of a sleeve, and forming a shoulder 21a seating against a loose collar 22 secured in the outer end of the collar or bracket 6. This collar 22 is formed with outwardly projecting ears 23 similar to the ears 16, and which project through radial slots 24 in the wall of shaft 7, similar to the slots 17. These ears 23 are secured to the end of the sleeve 6, as will be described hereinafter. These slots 24 permit the bracket or sleeve 6 to be shifted toward the right from the position in which it is shown in Figure 1. When the weights 1 and 2 swing out, the links 8 pull the collar 10 toward the left and shift the control valve toward the left. Hence it will be evident that the spring 18 not only resists the movement of the collar 10 when the centrifugal weights 1 and 2 tend to move outwardly under the action of the centrifugal force, but it also resists movement of the bracket 6 toward the right when the same is moved in this direction through the agency of lever 33 to vary the action of the governor. In other words, this spring 18 in the position of rest as in Figure 1, holds the shoulder 21a up against the collar 22 and holds the collar 22 up against the end of the bore in shaft 7, and this collar 22 is carried on the inner end of a stem 26 that extends through a cap 27a on the outer end of the casing 27. The use of the loose collars 22 and 10 enables the governor to rotate without rotating the spring or the control member 11. In accordance with my invention, I provide means operable at will, to move this stem 26 in or out, and this means is preferably controlled so that it is correlated to the throttle condition of the motor that drives the transmission mechanism that is to be controlled by the governor. For this reason it is preferable to provide means for operating this stem 26, that is correlated to the control of the operating medium for the motor. In the present instance, assuming that the motor is a gas engine, I provide means for controlling this stem 26 simultaneously with the control of the accelerator or throttle valve of the motor. Any suitable means may be employed for effecting this connection. In the present instance, I illustrate a throttle 28 having an operating lever 28a controlled by a link 29 leading to a throttle pedal or lever 29a, and the throttle shaft 30 is provided with a rigid lever 31 that is connected by a thrust rod or link 32 to a bell-crank lever 33 mounted to rock on the casing 27, said bell-crank lever including a short arm 34 that is connected by a link 35 with the outer end of the stem 26. A coil spring 36 may be provided for returning the bell-crank lever 33.

The thrust rod 32 has a guide tip 32a that slides freely through a block 32b that is swiveled by a pin 32c on the end of the arm of the bell-crank lever 33 to which the thrust rod connects. A collar 32d on the rod 32 enables force to be exerted on the block 32b to rock the bell-crank lever toward the left as viewed in Figure 1.

In the mode of operation of the governor, it will be noted that when the throttle 28 is moved to a partially open position from the position shown in Figure 1, the bell-crank lever will swing in a counter-clockwise direction, and the link 35 will pull the stem 26 toward the right, thereby moving the shoulder 21a toward the right, thereby permitting the sleeve 6 to move toward the right under the action of the governor weights 1 and 2 and also further compressing the spring 18. This permitted movement of the pins 5 toward the right, as viewed in Figure 1, will give a new relatively fixed position for the left end of the governor weights 1 and 2 and enable them to swing out to a greater distance or radius from the axis of the governor. At the same time, the increased compression of the spring 18 will increase the resistance offered to the movement of the collar 10 under the action of the governor weights rotating at a high speed, thereby enabling the governor to function at higher speed ranges. The greater spring force is compensated for partially by the increased centrifugal force due to the weights being at a greater radius. The characteristics of the governor are changed in such a way that the more compressed spring has more effect that the greater centrifugal force of the weights due to their increased radius. It is the change in spring compression together with the outward shifting of the weights, and the angularity of the arms 3 and 8 that give the desired characteristics of the controlled part of the governor under the new load conditions. As the vehicle is accelerated from a condition of rest by the engine, the governor weights 1 and 2 will be rotated at a speed corresponding to the speed of the vehicle, and eventually will arrive at a balance position in which the centrifugal force is balanced by the force exerted by the spring 18. As the weights 1 and 2 move out to establish this balance position, the control member 11 will move into a position to admit the hydraulic pressure to control the transmission mechanism and will throw the same successively into second, third, and fourth gear. If the driver desires a quick start, the throttle is opened further to quickly accelerate the motor and vehicle and the collar 6 will be moved further toward the right, increasing the compression of the spring 18 and establishing a new balance position for the governor weights. As the motor and vehicle accelerate, the control member 11 will be moved toward the left from its position shown in Figure 1, thereby controlling the transmission to put it into second speed, third speed, etc. In the present instance, the different drives of the transmission are established by closing hydraulic clutches in the transmission mechanism, as will be described hereinafter.

In the first speed position, that corresponds to the position of the control valve 11, as shown in Fig. 1, neither of the clutches are closed. When the speed of the vehicle accelerates sufficiently, the governor weights 1 and 2 will move out and they, acting through the links 8, will move the collar 16 and valve 11 to the left sufficiently to close the first clutch but not the second clutch; the second speed drive will thereby be established through the transmission. As the valve 11 becomes controlled by the governor to move further toward the left, it will release the pressure at the first clutch and thereby open same, but will close the second clutch, thereby establishing relation in the transmission for third speed. When the speed of the vehicle increases further, the governor will move the governor weights still further out, and the links 8 will pull the valve up to its extreme position to the left; and this will place the valve 11 in the position to close both clutches, which will correspond to fourth speed drive through the transmission. Although any suitable valve arrangement may be employed for effecting a result such as this, in the present instance this may be accomplished by providing the casing 27 with ports and passages as illustrated in Figures 1, 2 and 3. These ports and passages include an annular inlet passage 37, which is supplied with an operating fluid such as liquid under pressure through a pipe connection 38. To the right of this passage 37 a passage 39 is provided, which is connected by a pipe connection 40 to the first clutch $C^1$. Immediately on the left of the pressure connection 38 as illustrated in Figure 1, a passage 41 is provided, which is connected by a pipe connection 42 to the second clutch $C^2$. To the left of the passage 41, a passage 43 is provided, connected by a pipe connection 44 to the outlet. The valve 11 is of uniform diameter but provided with three necks 45, 46 and 47 of reduced diameter. The sleeve 15 is provided with oppositely disposed slots or ports 48, which are of considerable length, and in line with these ports but further to the right, the inner end of the sleeve 15 is formed with oppositely disposed slots or ports 49. For example, these ports 48 and 49 may be considered as being located in a horizontal plane. The sleeve 15 in its vertical plane is provided with a pair of diametrically opposite slots or ports 50 near the inner end of the sleeve, which are relatively short, and beyond these ports 50, similar but longer ports 51 are provided (see Figure 1) that extend out to a point near the inner end of the sleeve. In the position of rest of the governor as illustrated in Figure 1, the annular space around the neck 45 and within the diameter of the valve 11, will open the second clutch to the outlet pipe 44. At the same time, the annular space around the neck 46 opens communication through the slots 49 and through slots 52 at the end of the sleeve 15 into the interior of the casing at 53. In this way both the clutches will be without pressure and will remain open. As soon as the governor acquires sufficient speed, the governor weights 1 and 2 will swing outwardly, and the collar 10 and valve 11 will be moved slightly toward the left. As this movement progresses, when the neck 46 communicates with the slot 51, the operating fluid or liquid under pressure from the passage 37 will be admitted to the passage 39 and thence to the first clutch. At this time the neck 45 will still be maintaining the second clutch open to the outlet. This will correspond to second speed.

When the neck 46 advances sufficiently toward the left, the annular space around it will eventually open communication between the inlet passage 37 and the passage 41 that leads to the second clutch. When this occurs, however, the full diameter of the valve 11 will be closing off communication from the inlet passage 37 to the passage 39. This corresponds to the third speed.

In the extreme position toward the left as illustrated in Figure 3, the spaces around the necks 46 and 47 will operate respectively to open communication between the inlet passage 37 and the passages 41 and 39 respectively, effecting closing of both the clutches; this position corresponds to fourth speed.

It is evident from Fig. 3 (the fourth speed position for the valve 11) that after the fourth speed position for the valve 11 is reached, it will remain in this position regardless of any increase in speed of the governor, due to the enlarged diameter of shoulder 86 of the valve 11, coming in contact with the end of the slotted sleeve 15. The maximum travel for the valve 11, to obtain all the speeds for the transmission, is only a portion of the total travel that the governor is capable of; the other portion of the travel of the governor being utilized by the sleeve 6 that can be moved to the right to approximately half the total travel of the governor without forcing the valve 11 back from its fourth speed position, due to the collar 6 coming in contact with the projections 16 of the collar 10.

If the operator desires a slow start, he only partially opens his throttle which may scarcely allow the collar 6 to move to the right. As the speed picks up, the valve 11 is moved to the left, as the spring 36 prevents the collar 6 from moving. However, after the fourth speed has been reached, the valve 11 reaches the limit of its travel, and any further increase in speed causes the governor weights to draw the collar 6 up to where it may finally come in contact with the projections 16 of the collar 10, in which case the lever 33 will over-ride the throttle connection 32. In the condition above described, the governor will cause the transmission to shift from first speed to second speed, at approximately six miles per hour; from second to third speed at approximately eleven miles per hour; and from third to fourth speed at approximately eighteen miles per hour.

If the operator desires a fast start, he naturally opens the throttle wide, which allows the collar 6 to move about half the total governor travel to the right, allowing the weights to have a greater diameter of rotation, and greatly increasing the force of spring 18. This condition gives different characteristics to the governor, which now will move the valve 11 to the left so as to shift the speeds of the transmission from first to second, second to third, and third to fourth, at approximately twenty, thirty-five, and fifty miles per hour, respectively.

The over-riding feature of the lever 33 on the throttle connection 32 is an important feature, for if the throttle connection was connected directly with the lever 36, and the car started down a steep grade, the speed of the governor would increase to where its force would be sufficient to pull the collar 6 to the right, which would force the throttle to open, whereas the operator would want the throttle closed. In other words, the operator would lose control of the throttle.

A second function of the over-riding feature above mentioned, is to reduce the thrust loads of the governor. After the valve 11 has moved its portion of the governor travel to the left, if the collar 6 were held in its extreme left position and the governor speeded up to a high speed, such as may happen in coming down a steep hill, the force of the weights tending to move the collar 6, would become very great and would wear out the thrust surfaces in a short time. Due to the over-riding feature, which allows the collar 6 to move to the right, after the valve 11 has reached its limit of travel, to where the projections 16 of the collar 10 come in contact with the collar 6, the thrust loads are only those due only to the spring forces which are not great.

The apparatus is preferably provided with means for shifting the valve 11 quickly from third speed to fourth speed position. For this purpose I provide the inner end of the valve 11 with cam means formed by employing two annular grooves 54 and 55 which cooperate with pawls or arms 57 that are pivotally supported at 58 on the casing to swing radially toward the axis of the valve, and these pawls or arms are urged inwardly by coil springs 59. In the present instance these pawls are illustrated carrying rollers 56 for engaging the grooves. In the third position the rollers 56 will ride in the annular groove 54. Between the grooves 54 and 55, an annular shoulder 60 is formed on the end of the valve, which has inclined side faces. In passing from the third speed position to the fourth speed position, as soon as this shoulder 60 has passed beyond mid-position under the rollers 56, the springs 59 will snap the arms 57 inwardly, and seat the rollers 56 in the groove 55. The inclined side faces 61 of the shoulder 60 cooperate in this mode of operation. One of the advantages of this mode of operation is that the governor will not be operating to be constantly changing the position of the valve, but will only do so upon a considerable change in the speed of the governor, which can be predetermined for practical purposes.

It is preferable to provide means for cushioning the return of the valve 11 to prevent too great a return movement, if the pressure of spring 18 is suddenly increased by a sudden opening of the throttle. For this purpose I provide the inner end of the casing with a bonnet 62, which has a substantially cylindrical chamber 63 in its inner end, said chamber being cut off from the inner space 53 of the casing by an annular shoulder 64 that projects in from the side wall of the bonnet. The inner diameter at this shoulder 64 is substantially the same as the diameter of a disc or head 65 that is attached on the end of the valve 11. In the extreme position of the valve for fourth speed, when the rollers 56 are in the annular groove 55, the disc 65 will be located to the left of this shoulder 64, and when the valve 11 moves to the right towards its returned position, the disc 65 will nearly close the opening at the shoulder 64 as it passes through it. In this way the air in the chamber 63 will be slightly compressed and will give a cushioning effect. This prevents an over control which may otherwise result if the throttle were opened very rapidly as referred to above.

The apparatus is preferably provided with means for controlling the valve 11 at will to move it back toward its position of rest regardless of the governor. In other words, I provide means either operated by a hand lever, or a pedal, for positively moving the valve 11 toward or to its position of rest when desired. For this purpose I provide the inner end of the valve with an annular shoulder 66, which is in the path of the end of a lever 67 mounted on a rock shaft 68, which extends to the exterior of the casing, and is provided with a lever 69 for operating the same by means of a link 70. This link 70 will connect with a lever or pedal within reach of the driver's position.

Referring again to the collar 22 and its radially projecting ears 23, any means may be employed for connecting these ears 23 to the sleeve 6. For this purpose I may provide the outer faces of the ears 23 with a groove 71, which registers with a peripheral groove 72 that extends around the outer face of the sleeve 6. In the registering grooves 71 and 72, I provide a spring ring 73 that secures these parts together.

The spring 18 is preferably constructed so that it requires less force to compress it when it is in its extended position than is required after the collar 10 has moved some distance from its position of rest. In order to do this, the coils 18a of the spring at one end, may be made of smaller cross-section so that they will be relatively weaker. When the spring is constructed in this way, it will require less force to compress this end of the spring than the rest of the spring, but if these coils 18a have been compressed together, then it will require more force in proportion to compress the remaining open coils of the spring. If desired, the coils 18a may be made close together, so that in the action of the spring they will come together or "close up," and after they do, then the other coils of the spring will commence to close. This effect may be accomplished as illustrated in Figure 5, by cutting down the outside portions of the spring sections along conical faces 74. This would make the coils successively weaker toward the extreme end 75 of the spring.

Referring to Figs. 7 and 8, when liquid under pressure is admitted through the pipe 40, the corresponding clutch member 76 moves over toward the right and clamps a ring 77 against a ring 78, thereby causing the planetary set 79 with its pinions 80 to rotate at the same speed as the central gear 81 on driven shaft 82. This, of course, prevents the planetary pinions 80 from rotating, and therefore would cause the members 77 and 81 to rotate at the same speed as the internal driving gear 83 on the motor-driven shaft 84, and giving a 1-to-1 drive ration from the driving shaft 84 to the driven shaft 82.

If, on the other hand, the oil is allowed to escape from the compartment back of the clutch member 76, the clutch will become disengaged. The oil will also flow from the corresponding pressure chamber, permitting the spring 86 to apply the brake-band 87 on the drum 88, thereby preventing the drum with its gear 81 from rotating. Now, the drive will come from the driving shaft 84 to the internal gear 83, and this will rotate the planetary set 79 around the stationary gear 81, and will cause the shaft 82 to rotate at a slower speed than the driving shaft 84. The action of the second clutch and the second planetary set is the same as that just described for the first set, but shaft 82 then becomes the drive shaft for the second planetary set 89. The clutch C² is controlled, of course, by its hydraulic pressure cylinder 90, which is like the cylinder 77.

The cylinders 77 and 90 are connected respectively to the hydraulic pressure pipes 40 and 42 through lateral passages 77a and 90a.

In Figure 10 the connections of these pipes to and from the casing 27 at the control member 11 are illustrated, and also the pipe 38 that leads from a pump 92 up to connect to the chamber or passage 37.

Figure 10 also illustrates the flexible push stem 70 leading up to the dash 93.

It is understood that the embodiment of the invention described herein, is only one of the many embodiments this invention may take, and I do not wish to be limited in the practice of the invention nor in the claims to the particular embodiment set forth.

What I claim is:

1. In a centrifugal governor for controlling the transmission mechanism of a fluid-operated motor driven vehicle having a valve for controlling flow of the operating fluid, the combination of a relatively fixed member, a governor weight, a relatively movable member connected with the same and to the relatively fixed member, said weight controlled by the speed of rotation of the governor, means operatable at will for opening and closing the valve and for shifting the position of the relatively fixed member nearer to the relatively movable member to vary the action of the governor, means controlled by the relatively movable member for controlling the transmission mechanism, and means for resisting the movement of the relatively movable member due to an increase of speed of rotation of the governor, and for returning the said relatively fixed member after the same has been shifted toward the said relatively movable member.

2. In a centrifugal governor for the control of a fluid-operated motor-driven vehicle, the combination of a relatively fixed member and a relatively movable member mounted for rotation on an axis, centrifugally controlled means connecting said members the position of which is controlled by the centrifugal force of the governor, for moving the relatively movable member to and fro on said axis according to changes in speed of the governor; a member to be controlled by the governor connected to the said relatively movable member, means for simultaneously controlling the operating fluid for the motor and for shifting the relatively fixed member along its axis of rotation nearer to the relatively movable member and thereby varying the effect that the governor has upon the member that is to be controlled by the governor; and means for resisting the movement of the relatively movable member by an increase of speed of rotation of the governor, and for returning the said relatively fixed member after the same has been shifted toward the said relatively movable member.

3. In a centrifugal governor for a motor-driven transmission mechanism, the combination of a relatively fixed member, a relatively movable member, centrifugally controlled means connecting said relatively movable member to the relatively fixed member the relative position of which is controlled by the speed of rotation of the governor, means for resisting the centrifugal movement of said centrifugally controlled means by the centrifugal force, means operatable at will for controlling flow of operating fluid to the motor and for effecting the shifting of the position of the relatively fixed member in one direction with respect to the relatively movable member to adapt the action of the governor to the relative position of the last-named means, and the load condition of the motor corresponding to the degree of opening of the means for controlling the flow of the operating fluid to the motor, and means controlled by the relatively movable member for controlling the transmission mechanism.

4. In a centrifugal governor, the combination of a relatively fixed member and a relatively movable member mounted for rotation on an axis, means connecting said members including centrifugal weights operating to move the movable member to and fro along said axis when speed changes occur in the governor, resistance means for resisting the movement of the relatively movable member by the centrifugal weights, and adjustment means operatable at will for moving the relatively fixed member to change its distance from the relatively movable member, and simultaneously increasing the force exerted by the said resistance means to adjust the operating characteristics of the governor.

5. In a centrifugal governor, the combination of a relatively fixed member and a relatively movable member mounted for rotation on an axis, means connecting said members including centrifugal weights operating to move the movable member to and fro along said axis when speed changes occur in the governor, a spring for resisting the movement of the relatively movable member by the centrifugal weights, and adjustment means operatable at will for moving the relatively fixed member to change its distance from the relatively movable member, and simultaneously increasing the force exerted by the said spring to adjust the operating characteristics of the governor.

6. In a centrifugal governor the combination of a relatively fixed member and a relatively movable member mounted for rotation on an axis, means connecting said members including centrifugal weights operating to move the movable member to and fro along said axis when speed changes occur in the governor, a spring mounted between the members and thrusting against the same for resisting the movement of the relatively movable member by the centrifugal weights and for resisting the movement of the relatively fixed member toward the relatively movable member, and adjustment means operatable at will for shifting the position of the relatively fixed member to vary the initial spring force to adjust the operating characteristics of the governor.

7. In a centrifugal governor control, the combination of a movable centrifugal weight, a relatively movable member attached to said weight, with means for limiting its movement, a spring tending to hold said relatively movable member toward the limit of its movement and opposing the centrifugal force of the weight, a control member capable of limited movement attached to said relatively movable member so as to be controlled through said limited movement in response to speed values of the governor, a relatively fixed member attached to said weight, and means for varying the position of said second relatively fixed member so as to cause the control of said control member through said same limited movement to be effected at speed values of the governor different than the first-named speed values.

8. In a governor control, the combination of a weight rotatively mounted and pivotally mounted at two points; a control member attached to said weight at one point and mounted so that by rotating said weight at a given speed, the centrifugal force caused thereby will tend to move said control member in a given direction; a stop limiting the travel of said control member in the opposite direction; shifting means associated with the other pivot mounting of said weight movable to alter the position of the weight in respect to the axis of rotation, thereby affecting the degree of control that said weight has over said control member; and means for exerting a force opposing the movement of said control-member in said given direction, said last-named means being capable of returning said control member to any desired position from its governor-controlled position and as far as the said stop permits, regardless of the position of said shifting means.

9. In a centrifugal governor, the combination of a relatively fixed member and a relatively movable member mounted for rotation on an axis, means connecting said members including centrifugal weights operating to move the movable member to and fro along said axis when speed changes occur in the governor, a control member actuated by said relatively movable member, resistance means for resisting the movement of the relatively movable member in one direction by the centrifugal weights, adjustment means operatable at will for progressively altering the position of the relatively fixed member in a direction to increase the force exerted by the said resistance means to adapt the action of the governor to different operating conditions, and manually operatable means associated with said control member for positively adjusting the position of the control member regardless of the forces exerted upon it by the centrifugal governor.

10. In a governor control for a vehicle having a motor with an accelerator and a transmission, the combination of a weight, means for supporting the same to rotate about an axis, and also for movement about two separated points on said axis enabling the same to act as a centrifugal governor; a control member for controlling said transmission connected to one of said movable points, so as to govern the transmission in response to the rotating speed values of said weight; and means connecting the other of said movable points with the accelerator of said motor, so that when moving the accelerator, part of the said supporting means will be set to a corresponding position to affect the rotating speed values of said weight to a different degree, and thereby adapt it to the higher or lower load condition of the engine corresponding to the degree of opening of the accelerator.

11. In a centrifugal governor, the combination of a relatively fixed member; a relatively movable member with means connecting the same to the relatively fixed member, said relatively movable member controlled by the speed of rotation of the governor; means for opposing the centrifugal forces of the governor, a control member connected to said relatively movable member; means operatable at will for shifting the position of the relatively fixed member so as to vary the action of the governor; and manually operatable means associated with said control member for moving it positively in a direction to oppose and overcome the forces exerted upon it by the centrifugal governor.

12. In a controlling mechanism for controlling the transmission of a fluid-operated motor having an admission valve for the operating fluid, the combination of manually operated means connected to the valve for operating the same, a relatively fixed member and a relatively movable member mounted for rotation on an axis, means for connecting the said manually operated means to the relatively fixed member to effect shifting of the same, means connecting said relatively fixed member and said relatively movable member including centrifugal weights capable of moving the relatively movable member and the relatively fixed member to and fro along said axis when the centrifugal weights change their speed of rotation, means resisting the centrifugal movement of the centrifugal weights, and a control member for controlling the transmission, connected to the relatively movable member, said parts cooperating so that when the valve is moved to any given position the said relatively fixed member is moved to a corresponding position, whereby the relative position of the fixed member and the movable member is adapted to the speed of the motor that corresponds to the said given position of the valve.

13. In a controlling mechanism for controlling the transmission of a fluid-operated motor having a valve for controlling the flow of the operating fluid, the combination of manually operated means connected to the valve for operating the same, a relatively fixed member and a relatively movable member mounted for rotation on an axis, means for connecting the said manually operated means to the relatively fixed member to effect shifting of the same, means connecting said relatively fixed member and said relatively movable member including centrifugal weights operating to move the relatively movable member to and fro along said axis when the centrifugal weights change their speed of rotation, and a control member for controlling the transmission, connected to the relatively movable member, a spring exerting its force in a direction to oppose the centrifugal movement of the weights, said parts cooperating so that when the valve is moved to any given position the said relatively fixed member is moved to a corresponding position, whereby the relative position of the said relatively fixed member and the said relatively movable member is adapted to function at the speed of the motor that corresponds to the said given position of the valve.

14. In a controlling mechanism for controlling the transmission of a fluid-operated motor having an admission valve, the combination of manually operated means connected to the valve for operating the same, a relatively fixed member and a relatively movable member mounted for rotation on an axis, means connecting the said manually operated means to the relatively fixed member to effect shifting of the same, means connecting said relatively fixed member and said relatively movable member including centrifugal weights operating to move the relatively movable member to and fro along said axis when the centrifugal weights change their speed of rotation, and a control member for controlling the transmission, connected to the relatively movable member, a stop for limiting the movement of the relatively movable member in one direction, a compression spring between the said relatively fixed member and the said relatively movable member operating in the position of rest to hold the relatively movable member against said stop, said spring opposing centrifugal movement of the weights, said parts cooperating so that when the valve is moved to a more open position the spring will be further compressed, thereby adapting the same to function at the motor speed corresponding to the said more open position of the valve.

15. In a centrifugal governor control for an engine driven vehicle having a throttle, the combination of a governor weight rotatably mounted, and arms with pivotal supports and extending different directions from said weight, means resisting the centrifugal movement of the weight, a member that the governor is to control attached to the pivotal support of one of said arms; an adjusting means engaging the pivotal support of the other of said arms; and means connecting the engine throttle with said adjusting means for varying the effect of the governor weight upon said member that the governor is to control, and thereby adapting the governor to cooperate with the engine load condition corresponding to the degree of opening of the engine throttle.

16. In a governor for controlling a fluid-operated motor-driven vehicle having a valve for controlling flow of the operating fluid, the combination of a relatively fixed member, and a relatively movable member, centrifugal weights connecting the same and controlled by the speed of rotation of the governor; a member that is to be controlled by the governor connected to the relatively movable member, means for simultaneously controlling the valve and for shifting the position of the relatively fixed member relative to the relatively movable member to vary the effect that the governor has upon the said member that is to be controlled by the governor, and thereby adapt the governor to the load condition of the engine corresponding to the new position of the means for controlling the flow of the operating medium to the motor, and means for resisting the movement of the relatively movable member by the centrifugal action of the centrifugal weights.

17. In a governor control, the combination of a centrifugal governor including a relatively fixed member and a relatively movable member, and capable of moving along an axis; means to limit the movement of the relatively movable member along the axis to only a portion of the distance that the governor could otherwise move the relatively movable member; a controlling means connected to the relatively movable member so as to be controlled thereby, and by the speed of rotation of the governor; and resilient means associated with the relatively fixed member to prevent movement by the governor of the relatively fixed member along the axis until after the relatively movable member has been moved to the limit of its movement along the axis.

18. In a governor control, the combination of a centrifugal governor including a relatively fixed member and a relatively movable member, and capable of moving along an axis; means to limit the movement of the relatively movable member along the axis to only a portion of the distance that the governor could oherwise move the relatively movable member; a controlling means connected to the relatively movable member so as to be controlled thereby, and by the speed of rotation of the governor; resilient means associated with the relatively fixed member to prevent movement by the governor of the relatively fixed member along the axis until after the relatively movable member has been moved to the limit of its movement along the axis; and adjusting means to cause a movement of the relatively fixed member along the axis so as to affect the controlling action that the governor has on the control member.

CLIFTON R. ROCHE.